United States Patent [19]

Linossier

[11] Patent Number: 4,898,819

[45] Date of Patent: Feb. 6, 1990

[54] HETEROPOLYSACCHARIDE SOLUTIONS STABILIZED AGAINST VISCOSITY LOSS OVER TEMPERATURE AND TIME

[75] Inventor: Jean-Louis Linossier, Lyons, France

[73] Assignee: Rhone-Poulenc Specialities Chimiques, Courbevoie, France

[21] Appl. No.: 804,862

[22] Filed: Dec. 5, 1985

[30] Foreign Application Priority Data

Dec. 5, 1984 [FR] France .................. 84 18506

[51] Int. Cl.$^4$ ............................................. C12P 19/04
[52] U.S. Cl. ........................................ 435/93; 435/104
[58] Field of Search ................................. 435/93, 104

[56] References Cited

U.S. PATENT DOCUMENTS 4,425,246  1/1984  Holzwarth et al. ............. 536/114
4,458,753  7/1984  Philips et al. ................... 435/104

Primary Examiner—Barry S. Richman
Assistant Examiner—Timothy M. McMahon
Attorney, Agent, or Firm—Burns, Doane, Swecker & Mathis

[57] ABSTRACT

Aqueous saline solutions of ordered heteropolysaccharides useful, e.g., as displacement fluids in the secondary or tertiary recovery of crude oil from subterranean formations thereof, are stabilized against viscosity loss over temperature and time without adversely affecting the filterability thereof, by purging dissolved oxygen therefrom by degassing same with carbon dioxide, and then treating the degassed solutions with an effective amount of a reducing/deoxidizing agent as to maintain the pH thereof at a value ranging from 5 to 7.

9 Claims, No Drawings

HETEROPOLYSACCHARIDE SOLUTIONS STABILIZED AGAINST VISCOSITY LOSS OVER TEMPERATURE AND TIME

BACKGROUND OF THE INVENTION

1. Field of the Invention:

The present invention relates to the stabilization of the viscosity of solutions of polysaccharide biopolymers at elevated temperatures.

2. Description of the Prior Art:

Heteropolysaccharides or biopolymers obtained by the fermentation of a carbohydrate by the action of bacteria of the Genus *Xanthomonas*, or *Arthrobacter*, or *Alcagines*, or of fungi belonging to the Genus *Sclerotium*, have found numerous industrial applications by virtue of their thickening and viscosity increasing properties. Polysaccharides, such as xanthan gum, are used, in particular, in the development of oil fields, in mobility control fluids in assisted recovery and also in well drilling, reconditioning and completion fluids. Xanthan gum is characterized by high viscosity at low concentrations, great insensitivity to salinity and the nature of salts and high stability under mechanical stress. However, the use of polysaccharides is limited, on the one hand, by the difficulty in preparing solutions which do not clog rock formations and, on the other, by their lack of thermal stability. For the assisted recovery of oil, the viscosity of the polymer solutions must remain stable for an extended period of time at the temperatures encountered in the reservoirs, which could be higher than 60° C.. The loss of viscosity over the long term and at elevated temperatures is generally attributed to molecular degradation, with hydrolysis of the acetate, pyruvate, glucuronate radicals, release of the corresponding acids and cleavage of the glycoside bonds. The mechanism of such degradation is complex and depends upon such factors as temperature, dissolved oxygen content, pH and salinity.

Certain means have already been proposed to this art to obviate the aforesaid problems. For example, according to British Patent Specification No. 1,518,628 the stability of viscosity is improved by treatment of the aqueous liquid with a deoxidizing agent, followed by the addition of an antioxidant containing sulfur and a water-soluble oxidizable alcohol. The aqueous liquid is preferably soft water having a low salt content.

U.S. Pat. No. 4,425,246 features stabilizing heteropolysaccharide solutions containing at least 0.5% by weight inorganic salts by deoxidation with an inert gas and/or a deoxidizing agent including sulfites, bisulfites, hydroxylamine or hydrazine dithionates, followed by heat treatment and then filtration.

In published European Patent Applications Nos. 0106665 and 0106666, saline solutions of polysaccharide substantially free of dissolved oxygen are treated at a pH at least equal to 5 with an alkali metal borohydride or a dithionate, respectively.

The aforesaid processes make it possible to stabilize the viscosity of polysaccharides in a relatively efficient manner, but they suffer from the disadvantage of frequently being incompatible with the salinity of the formation water. The addition of the deoxidizing agent may give rise to the formation of insoluble salts or hydroxides in the solution that are difficult to filter and which clog the pores of the rock formations into which said solution is injected.

SUMMARY OF THE INVENTION

Accordingly, a major object of the present invention is the provision of simple and rapid means for stabilizing saline solutions of polysaccharides against viscosity loss at elevated temperatures over extended periods of time, especially without reducing the filterability characteristics thereof.

It is another object of the invention to provide polysaccharide solutions useful as displacement fluids in secondary or tertiary processes for the recovery of crude oil from subterranean formations exposed to elevated temperatures of up to at least 150° C..

Briefly, the stabilization according to the invention features:

(a) the preparation of an aqueous saline solution of a heteropolysaccharide having an ionic strength sufficient to generate the ordered form of the polysaccharide;

(b) the removal of dissolved oxygen from said saline heteropolysaccharide solution by degassing same with carbon dioxide; and (c) the addition of at least one reducing/deoxidizing agent in an amount sufficient to maintain the pH of said solution at a value ranging from 5 to 7.

DETAILED DESCRIPTION OF THE INVENTION

More particularly according to the present invention, the heteropolysaccharides or biopolymers may be any polysaccharide having hydrophilic, pseudoplastic and viscosifying properties and being the product of fermentation of a carbohydrate under the action of microorganisms. Exemplary of the microorganisms capable of producing hydrophilic gums, notably representative are bacteria of the Genus *Xanthomonas*, of the Genus *Arthrobacter*, of the Genus *Azotobacter*, of the Genus *Agrobacterium*, of the Genus *Erwinia*, of the Genus *Alcaligenes*, or fungi of the Genus *Sclerotium*.

The xanthan gum biopolymer produced by bacteria of the Genus *Xanthomonas*, and more specifically the biopolymer derived from the species *Xanthomonas campestris*, is preferred. Its molecular weight is greater than $10^6$. It contains, in the native state, units of D-glucose, D-mannose, D-glucuronate, O-acetyl and pyruvate radicals. The preparation of the xanthan gum is described in numerous publications and patents, for example, in U.S. Pat. Nos. 3,020,206, 3,391,060 and 4,154,654.

To prepare the aqueous saline solution, the polysaccharide is used in the form of a raw wort, or a powder of commercial grade. When deriving from the process of fermentation and production of the polysaccharide, the wort normally contains approximately 15 to 50 g/liter of the biopolymer and its pH ranges from about 6.5 to 7.5. Preferably used are worts which have been concentrated and/or clarified by any known method, such as ultrafiltration, heat treatment, enzyme treatment, filtering over diatomaceous earth, and the like. The concentration of the polysaccharide solution is not critical and may range from about 0.005 to 30% by weight. The solutions used as displacement fluids typically contain 0.02 to 3% by weight of polymer.

The powder of the entire wort may be diluted, if necessary, with water such as to provide the viscosity that is suitable for the selected application, while the concentration in salts of the aqueous solution must be sufficient to generate the ordered form of the macromolecules. The transition from the random form to the ordered form depends on numerous parameters, and in particular on the temperature and the ionic strength, but it remains independent of the polymer concentration in the measure wherein the ionic concentration is taken into account. The transition from the random form to the ordered form may be observed preliminarily by spectroscopic (rotating power, NMR, etc.), viscosimetric and pH-metric methods.

The salts present in the solution may comprise sodium, potassium, calcium, magnesium, barium, strontium and/or iron, for example, as the chlorides, iodides, sulfates, carbonates, bicarbonates and/or phosphates thereof. As a practical matter, in the assisted recovery of oil, formation waters or waters having a salinity close thereto, for example, bottom waters, are used for dilution.

The saline solution is purged by means of carbon dioxide utilizing any known technique, for example, by bubbling the $CO_2$ therethrough. The amount of $CO_2$ must be sufficient to maintain a minimum oxygen content in the solution. The presence of $CO_2$ participates in the calcocarbonic equilibrium of the solution. The polysaccharide may be dissolved either before, during or after the treatment with gaseous carbon dioxide.

The reducing/deoxidizing agents are well known to the art. The following are exemplary: sulfites, bisulfites, hydrosulfites, borohydrides, hydrazine, methylolsulfonic acids such as sodium bisulfite formaldehyde and sulfoxylate formaldehydes, such as sodium or zinc sulfoxylate formaldehyde. These reducing agents may be used either alone or in admixture. Hydrazine is especially preferred to avoid any precipitation of insoluble salts. The use of other deoxidizing agents may in certain instances give rise to the formation of insoluble salts, such as calcium sulfite hemihydrate, capable of affecting the filterability of the solution.

The hydrazine may be used in the anhydrous or hydrate form, or in the form of salts thereof, such as, for example, the chlorides, sulfate or as carbohydrazide.

The amount of the reducing agent must be sufficient to maintain the pH of the solution at a value of from 5 to 7 for an extended period of time. It has been found that amounts of from 100 to 1,500 ppm are typically suitable. Amounts less than 100 ppm do not permit the maintenance of the pH within the critical range. The upper limit is not critical, but amounts greater than 1,500 ppm are economically undesirable.

Other compounds may optionally be incorporated in the subject solutions, for example, free radical transfer agents such as lower alcohols, thioureas, hydroquinones, biocides, chelating agents, surface active agents, and others.

The solutions treated according to the process of the invention are especially useful in drilling operations and the exploitation of oil fields and, more specifically, in secondary and tertiary recovery from reservoirs at relatively elevated temperatures. The invention, therefore, also features a process for the secondary and tertiary recovery of oil, comprising injection into the formation of an aqueous, saline solution of a heteropolysaccharide which has been deoxidized by means of carbon dioxide and to which at least one reducing and deoxidizing agent has been added in an amount sufficient to maintain the pH of the solution at a value of from 5 to 7 for an extended period of time.

The combined action of the carbon dioxide and the reducing agent makes it possible, by stabilizing the pH, to maintain a satisfactory viscosity of the solution over a prolonged period of time. This combination has the further advantage of being compatible with the formation or bottom waters of any nature, and of preventing any precipitation of insoluble materials which would progressively clog the pores of the rock formations. This result could not be attained by treatment with the reducing agent itself, or together with an inert gas according to the prior art.

In order to further illustrate the present invention and the advantages thereof, the following specific examples are given, it being understood that same are intended only as illustrative and in nowise limitative.

EXAMPLE 1:

An aqueous solution containing 1,000 ppm of Xanthan biopolymer (RHODOFLOOD XR 75 marketed by Societe Rhone-Poulenc Petrole Services Co.) was prepared by dilution with saline water containing 100 g/l NaCl, 10 g/l $CaCl_2$ and 10 g/l $MgCl_2$.

Oxygen-free $CO_2$ was bubbled through an aliquot portion of said solution for 4 hours.

1,000 ppm hydrazine were added thereto in the form of hydrazine hydrate.

The solution was transferred under vacuum to borosilicate glass ampules, which were then flame-sealed such as to provide a gaseous space above the liquid.

The ampules were stored at 80° C. in a temperature controlled enclosure. The viscosity and the pH of the solution were measured periodically at predetermined intervals.

The results are reported in the Table I which follows.

EXAMPLE 2:

The procedure of Example 1 was repeated, followed by the further addition of 500 ppm formaldehyde to the solution.

The viscosity and pH results are also reported in Table I.

Filterability tests were carried out on the initial solution and a solution aged for six months at 80° C. under a constant pressure of 3 bars, using Millipore filters having a filtering surface of 13 mm and a porosity of 0.8 $\mu$m and 1.2 $\mu$m.

1.2 $\mu$m porosity—
Initial solution : 58 ml were filtered in 1 minute, 20 seconds
Aged solution 58 ml were filtered in 3 minutes, 35 seconds 0.8 $\mu$m porosity—
Initial solution : 50 ml were filtered in 10 minutes
Aged solution 38 ml were filtered in 10 minutes.

EXAMPLE 3:

The procedure of Example 1 was repeated, but the saline solution was synthetic sea water containing 24 g/l NaCl, 1.3 g/l $CaCl_2$, 5 g/l $MgCl_2$, 4.3 g/l $Na_2SO_4$ and 0.2 g/l $NaHCO_3$.

As in Example 1, the solution containing 1,000 ppm Xanthan was treated with $CO_2$ and 1,000 ppm hydrazine added thereto.

The results are also reported in Table I.

EXAMPLE 4:

The procedure of Example was repeated, but the hydrazine was replaced by 1,000 ppm sodium sulfite and 500 ppm formaldehyde.

A portion of the sulfite precipitated in the form of hemihydrated calcium sulfite. This precipitate disappeared during the first hours of aging.

The results are also reported in Table I.

EXAMPLE 5:

Example 1 was repeated, but adding to the aqueous solution, simultaneously with the hydrazine, 1,000 ppm isobutanol and 500 ppm thiourea.

Results equivalent to those of Example 1 were obtained (Table I).

EXAMPLE 6:

Example 1 was repeated, but with the addition of 100 ppm sodium dithionate to the solution containing the hydrazine.

The results were equivalent to those of Example 1 (Table I).

EXAMPLES 7 to 13:

In a series of comparative experiments, ampules were prepared in the manner described in Example 1 by using the same initial solution (except in Example 13) and varying the parameters of the treatment. The results are reported in the Table II which follows. The amounts of the additives were identical to those of Example 1, unless otherwise indicated.

It will be seen that:

(i) if the saline solution of the polysaccharide was degassed by means of $CO_2$ or helium, without the addition of a reducing agent, the pH dropped very rapidly and viscosity was not stabilized (Examples 8 and 9);

(ii) if the solution was not degassed prior to the addition of the hydrazine (Example 10), the decline in viscosity was rapid, and if degassing was effected by means of helium (Example 11), the viscosity continued to decline after two months at a temperature of 80° C.. Furthermore, in these two experiments the high pH values effects extensive formation of insoluble precipitates capable of reducing the permeability of a deposit;

(iii) the formation of the precipitate was immediate and persistent, if after degassing with helium, the hydrazine was replaced by the same amount of sodium sulfite (Example 12); and (iv) the necessity for using a saline solution is illustrated by Example 13. In this experiment, distilled water was used for the dilution.

TABLE I

| Example | Treatment | Viscosity* (mPa.s) and pH after storage at 80° C. for | | | | | | | | | | |
|---|---|---|---|---|---|---|---|---|---|---|---|---|
| | | 0 | | 2 days | | 15 days | | 1 month | | 2 months | | 6 months |
| 1 | $CO_2 + N_2H_4$ | 51.5 | 5.8 | 38.5 | 5.9 | 32 | 5.9 | 31.5 | 6.0 | 30 | 5.9 | 5.9 6.0 |
| 2 | $CO_2 + N_2H_4 + HCHO$ | 51 | 5.6 | 46.5 | 5.9 | 32 | 6.0 | 30 | 6.1 | 29.5 | 6.1 | 29.5 6.2 |
| 3 | $CO_2 + N_2H_4$** | 45 | 6.1 | 27 | 6.2 | 24.5 | 6.1 | 23 | 6.3 | 23 | 6.3 | 23 6.2 |
| 4 | $CO_2 + Na_2SO_3$ HCHO | 52.5 | 5.3 | 49 | 5.5 | 31 | 5.2 | 31.5 | 5.3 | 29 | 5.3 | 27.5 5.4 |
| 5 | $CO_2 + N_2H_4$ + isobutanol + $S=C(NH_2)_2$ | 50 | 5.7 | 35 | 6.1 | 31.5 | 6.2 | 30.5 | 6.2 | 30 | 6.1 | 29.5 6.2 |
| 6 | $CO_2 + N_2H_4 + Na_2S_2O_4$ | 53 | 6.0 | 36.5 | 6.0 | 30 | 6.0 | 30 | 6.1 | | | |

*Brookfield model LVT - adaptor UL. 30° C. - 7.3 s$^{-1}$
**Different salinity

TABLE II

Comparative Examples

| EXAMPLE | Treatment | Viscosity* (mPa.s) and pH after storage at 80° C. for | | | | | | | | | | |
|---|---|---|---|---|---|---|---|---|---|---|---|---|
| | | 0 | | 2 days | | 15 days | | 1 month | | 2 months | | 6 months |
| 7 | None | 53 | 7 | 27.5 | 6 | 11 | 4.2 | 3.5 | 4.0 | | | |
| 8 | $CO_2$ alone | 51 | — | 42 | 4.1 | 22.5 | 4.0 | 16 | 4.0 | 14.5 | 3.6 | 7.5 3.9 |
| 9 | He alone | 51.5 | 6.8 | 44.5 | 4.8 | 33 | 5.2 | 17 | 4.1 | 10 | 3.8 | 4 4.1 |
| 10 | $N_2H_4$ alone | 46 | 9.8 | 21.5 | 9.5 | 19.5 | 9.2 | 15.5 | 9.2 | 19.5 | 9.1 | 15 9.1 |
| 11 | $He + N_2H_4 + HCHO$ | 53.5 | 9.1 | 36.5 | 8.8 | 32.5 | 8.6 | 31.5 | 8.0 | 29.5 | 8.9 | 23 8.9 |
| 12 | $He + Na_2SO_3 + HCHO$ | 44 | 9.5 | 31.5 | 7.5 | 29.3 | 6.7 | 27.5 | 6.7 | 28 | 6.5 | 26 6.2 |
| 13** | $CO_2 + N_2H_4$ | 39.5 | 6.4 | 10.5 | 6.5 | 5.5 | 6.5 | 5 | 6.4 | | | |

*Brookfield model LVT - adaptor UL. 30° C. - 7.3$^{-1}$
**Zero salinity

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for stabilizing the viscosity of an aqueous saline solution of a heteropolysaccharide over temperature and time, comprising purging dissolved oxygen from such aqueous saline solution by degassing same with carbon dioxide, the ionic strength of which saline solution being such that said heteropolysaccharide exists therein in ordered form, and thence adding to said degassed solution an effective amount of a reducing-/deoxidizing agent as to maintain the pH thereof at a value ranging from 5 to 7, said carbon dioxide and reducing agent preventing precipitation of insoluble materials.

2. The process as defined by claim 1, said heteropolysaccharide comprising a xanthan gum.

3. The process as defined by claim 1, said aqueous saline solution comprising a fermentation wort.

4. The process as defined by claim 1, said reducing-/deoxidizing agent comprising hydrazine, sulfite, bisulfite, hydrosulfite, borohydride, or admixture thereof.

5. The process as defined by claim 4, said reducing-/deoxidizing agent comprising hydrazine or a hydrazine hydrate, or a chloride, sulfate or carbohydrazide thereof.

6. The process as defined by claim 1, the effective amount of said reducing/deoxidizing agent ranging from 100 to 1,500 ppm.

7. The process as defined by claim 1, wherein said aqueous saline solution further comprises a free radical transfer agent, a thiourea, a hydroquinone, a biocide, a chelating agent, a surface active agent, or admixture thereof.

8. The process as defined by claim 7, wherein said biocide is formaldehyde.

9. The process as defined in claim 7, wherein said free radical transfer agent is a lower alcohol.

* * * * *